US010491768B2

(12) United States Patent
Andoh et al.

(10) Patent No.: US 10,491,768 B2
(45) Date of Patent: Nov. 26, 2019

(54) IMAGE READING DEVICE CONFIGURED TO SELECTIVELY STOP A SHEET BASED ON IMAGE READING READINESS AND IMAGE FORMING APPARATUS INCORPORATING SAME (71) Applicants: Takayuki Andoh, Kanagawa (JP); Yasunobu Youda, Kanagawa (JP); Tatsuaki Nagano, Kanagawa (JP); Daisuke Imaki, Tokyo (JP); Satoshi Narai, Kanagawa (JP); Tomoya Fujii, Kanagawa (JP); Toshiyuki Horikawa, Kanagawa (JP); Koji Hatayama, Kanagawa (JP); Kaoru Tada, Kanagawa (JP); Munekazu Hirata, Kanagawa (JP); Naoto Kitamura, Kanagawa (JP)

(72) Inventors: Takayuki Andoh, Kanagawa (JP); Yasunobu Youda, Kanagawa (JP); Tatsuaki Nagano, Kanagawa (JP); Daisuke Imaki, Tokyo (JP); Satoshi Narai, Kanagawa (JP); Tomoya Fujii, Kanagawa (JP); Toshiyuki Horikawa, Kanagawa (JP); Koji Hatayama, Kanagawa (JP); Kaoru Tada, Kanagawa (JP); Munekazu Hirata, Kanagawa (JP); Naoto Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/106,054

(22) Filed: Aug. 21, 2018

(65) Prior Publication Data
US 2019/0068815 A1 Feb. 28, 2019

(30) Foreign Application Priority Data

Aug. 22, 2017 (JP) .................. 2017-159727

(51) Int. Cl.
H04N 1/04 (2006.01)
H04N 1/00 (2006.01)
(Continued)

(52) U.S. Cl.
CPC ......... H04N 1/00774 (2013.01); G03G 15/22 (2013.01); G03G 15/602 (2013.01);
(Continued)

(58) Field of Classification Search
None
See application file for complete search history.

(56) References Cited

U.S. PATENT DOCUMENTS 4,991,828 A * 2/1991 Mizoguchi ........... G06K 13/077
271/114
6,585,258 B1 * 7/2003 Hirota .................... G03G 15/60
271/10.01
(Continued)

FOREIGN PATENT DOCUMENTS

JP 2001-160885 6/2001
JP 2005-312065 11/2005
(Continued)

Primary Examiner — Dung D Tran
(74) Attorney, Agent, or Firm — Harness, Dickey & Pierce, P.L.C.

(57) ABSTRACT

An image reading device includes a plurality of conveyance rollers to convey a sheet, a motor to drive the plurality of conveyance rollers, an image reading unit to read an image of the sheet, a control device to perform a stop control that stops the sheet in a course of a conveyance path, and a clutch to transmit a driving force of the motor. A first conveyance roller group includes at least one of the plurality of conveyance rollers upstream from a leading end of the sheet stopped by the stop control in a conveyance direction, to which the driving force is transmitted via the clutch. A second conveyance roller group includes at least one of the plurality of conveyance rollers downstream from the leading (Continued)

end of the sheet stopped by the stop control in the conveyance direction, to which the driving force is transmitted without the clutch.

14 Claims, 8 Drawing Sheets

(51) Int. Cl.
    *G03G 15/22*     (2006.01)
    *H04N 1/12*     (2006.01)
    *G03G 15/00*     (2006.01)

(52) U.S. Cl.
    CPC ......... *H04N 1/00745* (2013.01); *H04N 1/125* (2013.01); *H04N 1/1215* (2013.01)

(56) References Cited

U.S. PATENT DOCUMENTS

| | | | |
|---|---|---|---|
| 8,054,483 B2 * | 11/2011 | Katsuyama | H04N 1/00326 358/1.1 |
| 8,322,710 B2 * | 12/2012 | Andoh | B65H 7/04 271/145 |
| 8,994,963 B2 * | 3/2015 | Osanai | G03G 15/602 271/121 |
| 2005/0179963 A1 * | 8/2005 | Nagano | H04N 1/1215 358/475 |
| 2005/0206968 A1 * | 9/2005 | Sodeura | H04N 1/00002 358/474 |
| 2007/0264063 A1 * | 11/2007 | Sano | G03G 15/602 399/367 |
| 2008/0291501 A1 | 11/2008 | Shiraki et al. | |
| 2008/0308995 A1 * | 12/2008 | Tobinaga | G03G 15/602 271/8.1 |
| 2009/0009829 A1 * | 1/2009 | Katsuyama | G06F 3/147 358/498 |
| 2013/0222826 A1 * | 8/2013 | Osanai | G03G 15/602 358/1.12 |
| 2016/0360073 A1 * | 12/2016 | Hatayama | H04N 1/6075 |
| 2017/0134598 A1 | 5/2017 | Nagano et al. | |
| 2017/0142265 A1 | 5/2017 | Horikawa et al. | |
| 2017/0142271 A1 | 5/2017 | Kawai et al. | |

FOREIGN PATENT DOCUMENTS

| | | |
|---|---|---|
| JP | 2011-049717 | 3/2011 |
| JP | 2014-060635 | 4/2014 |
| JP | 2015-041858 | 3/2015 |

* cited by examiner

IMAGE READING DEVICE CONFIGURED TO SELECTIVELY STOP A SHEET BASED ON IMAGE READING READINESS AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2017-159727, filed on Aug. 22, 2017, in the Japan Patent Office, the entire disclosure of which is hereby incorporated by reference herein.

BACKGROUND

Technical Field

The present disclosure relates to an image reading device and an image forming apparatus incorporating the image reading device.

Description of the Related Art

There is known an image reading device including a plurality of conveyance rollers to convey a sheet, a motor to drive the plurality of conveyance rollers, an image reading unit to read an image of the sheet conveyed by the plurality of conveyance rollers, and a control device to perform a stop control that stops the sheet in a course of a conveyance path.

SUMMARY

According to embodiments of the present disclosure, an improved image reading device includes a plurality of conveyance rollers to convey a sheet along a conveyance path, a motor to drive the plurality of conveyance rollers, an image reading unit to read an image of the sheet conveyed by the plurality of rollers, a control device to perform a stop control that stops the sheet in a course of the conveyance path, and a clutch to transmit a driving force of the motor. A first conveyance roller group includes at least one of the plurality of conveyance rollers upstream from a leading end of the sheet stopped by the stop control in a conveyance direction. The driving force is transmitted to the first conveyance roller group via the clutch. A second conveyance roller group includes a conveyance roller of the plurality of conveyance rollers downstream from the leading end of the sheet stopped by the stop control in the conveyance direction. The driving force is transmitted to the second conveyance roller group without the clutch.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

A description is given of an image forming apparatus 1 including an image reading device 5 according to an embodiment of the present disclosure.

Figure 1:
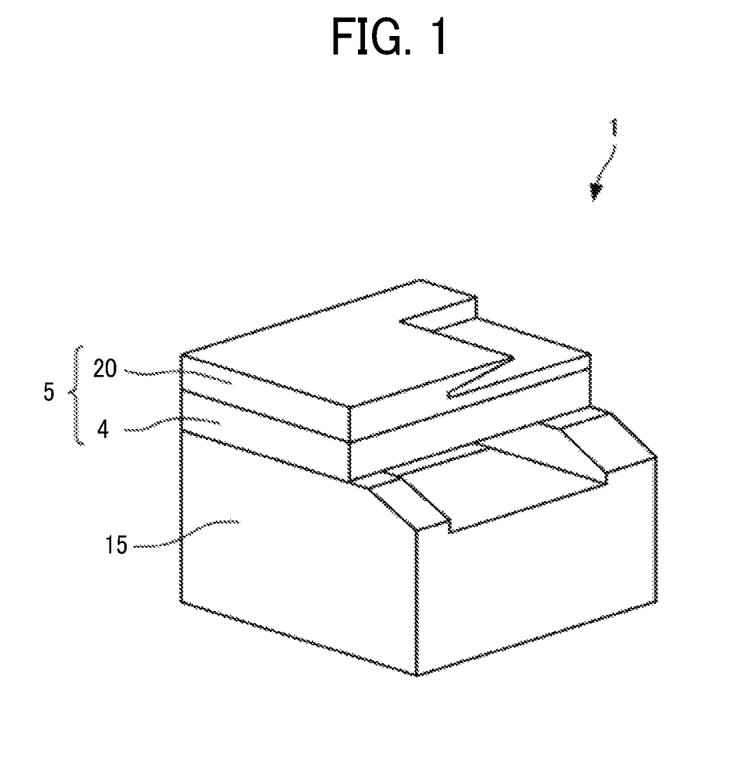
FIG. 1 is a perspective view of an image forming apparatus according to an embodiment of the present disclosure.

FIG. 1 is a perspective view of an example of the image forming apparatus 1 according to the present embodiment.

The image forming apparatus 1 illustrated in FIG. 1 has functions of a copier, a printer, a facsimile machine, a scanner, and the like and can form a full-color image or a monochrome image on a recording medium and can output a full-color image or a monochrome image in a data format based on input data such as image data read by the image reading device 5.

As illustrated in FIG. 1, the image forming apparatus 1 includes a sheet feeder, an image forming device 15, a scanner 4, and an auto document feeder (ADF) 20. The ADF 20 is disposed above the scanner 4 and the image forming device 15. The scanner 4 and the ADF 20 together constitute the image reading device 5.

A sheet feeder of the image forming device 15 includes multiple stages of sheet feeding trays to accommodate, for example, cut-sheet recording media and multiple sheet feeding rollers to pick up and feed a recording medium from an arbitrary sheet feeding tray. The sheet feeder further includes a sheet feeding path including various rollers to convey the recording medium fed by the sheet feeding roller to an image forming position of the image forming device 15.

The image forming device 15 includes, for example, an exposure device, multiple photoconductor drums, respective developing devices, a transfer belt, a secondary transferor, and a fixing device. The respective developing devices form toner images with respective four color toners of cyan (C), magenta (M), yellow (Y), and black (K).

In the image forming device 15, for example, the exposure device exposes each photoconductor drum based on image data read by the image reading device 5 to form an electrostatic latent image on the surface of the photoconductor drum. Then, each developing device supplies toner onto the electrostatic latent image on the surface of each photoconductor drum, thus developing the electrostatic latent image into a toner image. The toner image on each photoconductor drum of the image forming device 15 is primarily transferred onto the transfer belt. The toner image is secondarily transferred onto the recording medium. The fixing device fixes the toner image on the recording medium under heat and pressure, thereby forming a color image on the recording medium. The image forming device 15 can form an external output image to be output outside, such as image files or data, based on the image read by the scanner 4 or a backside image reading module 35 (i.e., a second image reading unit) to be described later. The above-described image reading device can be used in image forming devices of other recording types such as an inkjet method instead of the electrophotographic image forming device 15.

Figure 2:
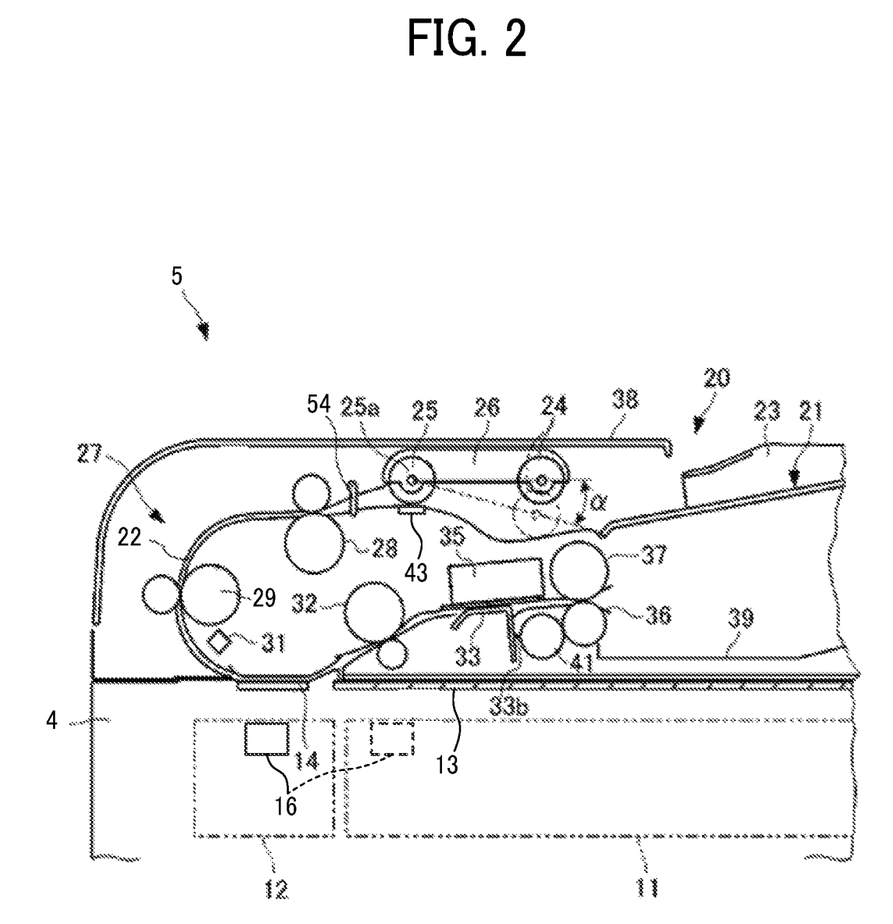
FIG. 2 is an enlarged schematic view illustrating a configuration of an image reading device according to an embodiment of the present disclosure.

Next, a description is given of the image reading device 5 of the image forming apparatus 1.

FIG. 2 is an enlarged schematic view illustrating a configuration of the image reading device 5 according to the present embodiment.

The image reading device 5 switches image reading modes between a flatbed scanner mode (a placed original document reading mode) and a document feeding (DF) scanner mode (a mobile original document reading mode).

If a start of reading is requested, for example, a copy start button is pressed while an original document is placed on a flatbed exposure glass 13 disposed on the top of the scanner 4, the flatbed scanner mode is performed to read the original document placed thereon. An image reading unit 16 moves along a moving area 11 for reading under the flatbed exposure glass 13 and irradiates an image face of the original document with a light. The reflected light from the image face of the original document is converted into an image signal to read an image of the original document.

In the DF scanner mode, the image reading unit 16 stops at a stopping area 12 for reading just under the DF exposure glass 14 to read the image of the original document being conveyed over the DF exposure glass 14.

In the DF scanner mode, the ADF 20 separates an original document of a bundle of original documents loaded on a document loading tray 21 one by one and conveys the original document along a document conveyance path 22. The document loading tray 21 functions as an original document loading table. While being conveyed, the original document is brought to face the DF exposure glass 14. That is, the part of the original document passes sequentially from a leading end to a trailing end in a direction of conveyance of the original document over the upper face side of the DF exposure glass 14. Note that, hereinafter, the direction of conveyance of the original document is referred to as a conveyance direction.

The ADF 20 is attached to a rear part (a back side) of an upper face side of the scanner 4 via an opening and closing mechanism such as a hinge or hinges. The ADF 20 moves between an open position at which the ADF 20 is open relative to the flatbed exposure glass 13 of the scanner 4 and a closed position at which the ADF 20 presses the original document placed on the flatbed exposure glass 13.

The image reading unit 16 is, but not limited to, a charge-coupled device (CCD) module or a contact image sensor (CIS) module that can read the image on the surface of the original document by repeated line scanning as predetermined image reading positions on the exposure glasses 13 and 14. Alternatively, an image reading unit secured to the stopping area 12 for reading and an image reading unit movable along the flatbed exposure glass 13 in the moving area 11 may be separately provided.

The document loading tray 21 is provided with side guide plates 23. The side guide plates 23 are a movable pair of right and left guide plates to position the original document set in the ADF 20 in a sheet width direction of the original document that is perpendicular to the conveyance direction of the original document. The side guide plates 23 are relatively separable from and closable to each other in the sheet width direction of the original document so as to match center positions of the document loading tray 21 and the original document in the sheet width direction each other. Alternatively, one plate of the pair of side guide plates 23 may be disposed fixedly on the document loading tray 21. In such a case, one end of the original document is contacted to one end of the fixed plate of the side guide plates 23 and a movable plate of the pair of the side guide plates 23 moves to contact the opposite end of the original document.

A cover 38 is disposed openably closable to cover at least an upper side of the ADF 20. A main guide portion constituting the document conveyance path 22 of the ADF 20 is formed by a rib disposed on the cover 38. The ADF 20 includes a pickup roller 24, a document feed roller 25, and a separation pad 43. The pickup roller 24 picks up the original document loaded on the document loading tray 21 in the conveyance direction of the original document. The document feed roller 25 and the separation pad 43 feed the original document picked by the pickup roller 24 in the conveyance direction toward the document conveyance path 22. The separation pad 43 is disposed facing the document feed roller 25.

The ADF 20 includes a conveyance device 27 to convey the original document fed into the document conveyance path 22 to the DF exposure glass 14 by the document feed roller 25 in a posture in which the image of the original document can be read on the DF exposure glass 14. Then, the conveyance device 27 conveys the original document after the image reading to an ejection port 36.

The conveyance device 27 conveys the original document separated and fed by the document feed roller 25 through the document conveyance path 22 by causing the original document to be turned and reversed, so that the original document passes through the predetermined image reading position along the top face of the DF exposure glass 14. For such document conveyance, a first conveyance roller 28, a second conveyance roller 29, and a registration sensor 31 are disposed upstream from the DF exposure glass 14 in the document conveyance path 22. The registration sensor 31 detects the leading end of the original document in the conveyance direction.

The first conveyance roller 28 and the second conveyance roller 29 convey the original document separated by the document feed roller 25 over the DF exposure glass 14. Then, the image reading unit 16 timely reads the image on the surface of the original document based on the detection timing of the leading end of the original document by the registration sensor 31.

For example, as the registration sensor 31 detects the leading end of the original document, a control device specifies a timing at which the leading end of the original document reaches the image reading position on the DF exposure glass 14. The position of the leading end of the original document can be specified based on pulse count of a document feed motor 51 (see FIG. 4) as a driving source. The control device starts to transmit a gate signal and continues to transmit the gate signal until the trailing end of the original document passes through the image reading position. The gate signal indicates an effective image area on the surface of the original document in the sub-scanning direction.

In a case in which a backside image is required to be read, the backside image reading module 35 (the second image reading unit) including close contact image sensor reads the backside image.

The backside image reading module 35 includes a light source to irradiate the original document with a light based on a turn-on signal from the control device, multiple sensor chips to receive the reflected light from the original document, and multiple amplifiers to amplify the signals output from respective sensor chips. The backside image reading module 35 further includes an analog to digital (AD) converter to convert the amplified signal by the amplifier from analog signal to digital signal and an image processor to apply image processing to the digital-converted signal. The backside image reading module 35 yet further includes output control circuitry to control an output of the signal stored in the frame memory based on a timing signal from the control device and interface circuitry to output the signal from the output control circuitry to an apparatus body. The timing to read the backside image by the backside image reading module 35 is controlled similarly to front side image, and the original document after reading is ejected to a document ejection tray 39.

An exit roller 32 to convey the original document, on which the image reading unit 16 has read a front side image, to the backside image reading module 35 is disposed downstream from the DF exposure glass 14 in the document conveyance path 22. A white guide 33 and the backside image reading module 35 are disposed downstream from the exit roller 32, and a document ejection roller 37 is disposed downstream from the backside image reading module 35 and the white guide 33 in the conveyance direction.

The white guide 33 functions as a guide to guide the original document along the backside image reading module 35 and includes a white reference 33a for shading correction facing the whole area of the backside image reading module 35 in the main-scanning direction.

Figure 3:
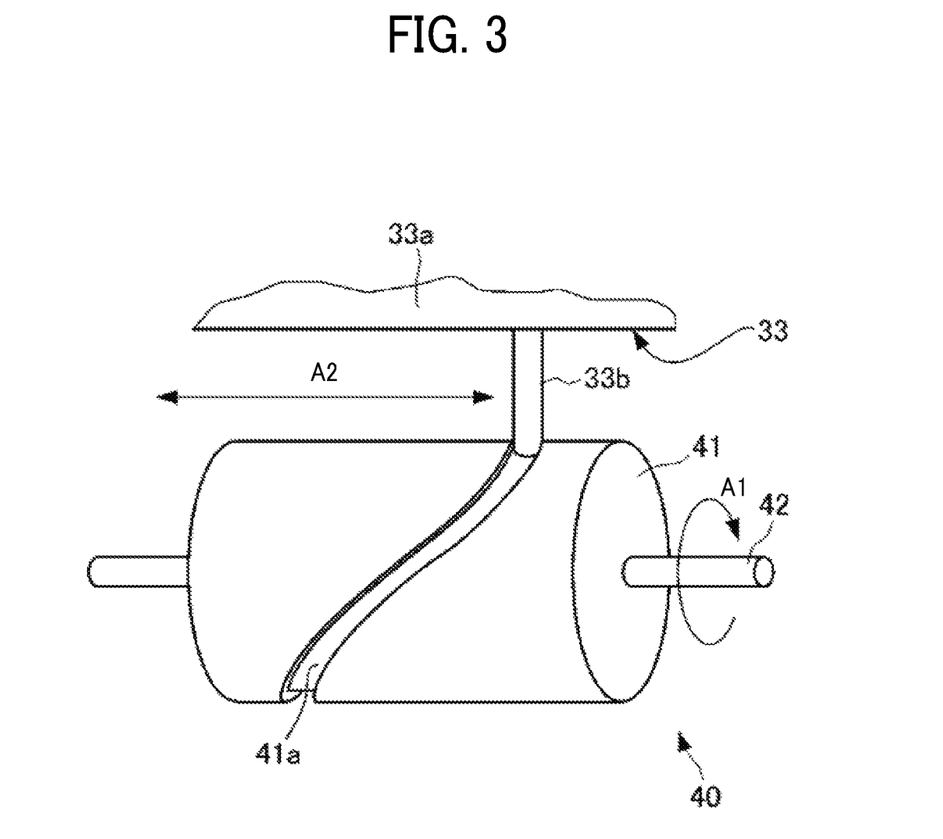
FIG. 3 is a schematic view illustrating a guide movement mechanism according to an embodiment of the present disclosure.

FIG. 3 is a schematic view of the guide moving mechanism 40 to move the white guide 33 in the main-scanning direction.

As illustrated in FIG. 3, the guide moving mechanism 40 includes a cylindrical cam 41, and a cam groove 41a is disposed on the outer surface of the cylindrical cam 41. A tip of an engage shaft 33b, which is disposed on the surface extending from the downstream end of the white reference 33a of the white guide 33 in the conveyance direction toward the flatbed exposure glass 13, engages the cam groove 41a. A driving force of the document feed motor 51 is transmitted to a cam shaft 42 of the cylindrical cam 41 via a one-way clutch 53 (see FIG. 4). When the document feed motor 51 rotates forward, the one-way clutch 53 shuts off the driving force to the cam shaft 42, and when the document feed motor 51 rotates in reverse, the one-way clutch transmits the driving force to the cam shaft 42. The term "forward rotation" used herein means rotation in a first direction in which the original document is conveyed in the conveyance direction. The term "reverse rotation" used herein means rotation in a second direction opposite the first direction.

In the case of shading correction, as the document feed motor 51 rotates in reverse, the cylindrical cam 41 rotates in a direction indicated by arrow A1 in FIG. 3. Accordingly, the white guide 33 reciprocates in a direction indicated by arrow A2 in FIG. 3. In the present embodiment, the white guide 33 moves in main-scanning direction, but may move in the conveyance direction. However, from the viewpoint of conveying the original document reliably, the white guide 33 preferably moves while keeping posture thereof. Therefore, from the view of posture maintenance, the white guide 33 preferably moves in main-scanning direction.

Figure 4:
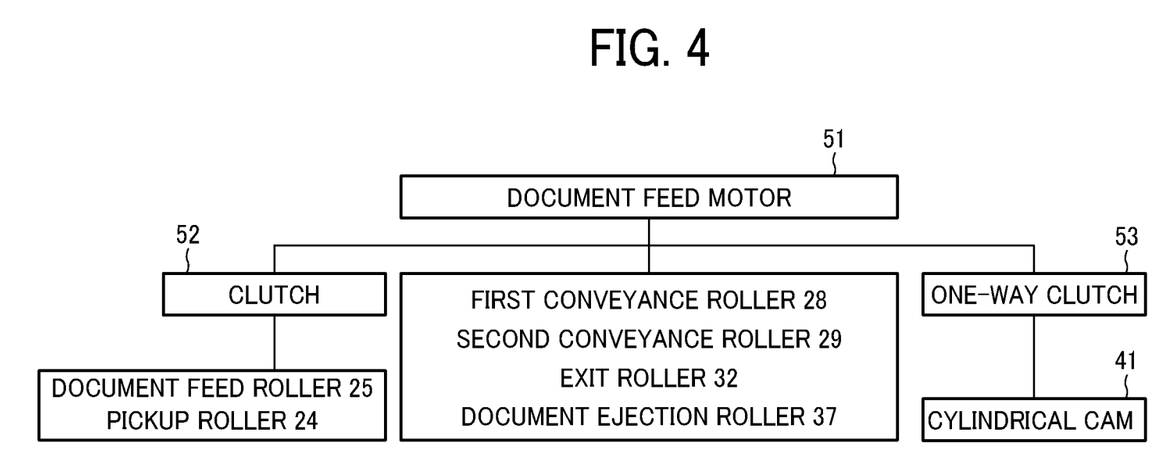
FIG. 4 is a block diagram of a drive system of an auto document feeder (ADF) according to an embodiment of the present disclosure.

FIG. 4 is a block diagram of a driving system of the ADF 20 according to the present embodiment.

As illustrated in FIG. 4, a clutch 52 to switch coupling and decoupling of the driving side and the driven side is disposed on a drive transmission route from the document feed motor 51 to a feed roller shaft 25a. The pickup time and conveyance interval (inter-sheet distance) of the original document are controlled by switching on (coupling or connection) and off (decoupling or cutoff) of the clutch 52. In the present embodiment, the driving force of the document feed motor 51 is also transmitted to conveyance drivers, such as the first conveyance roller 28, the second conveyance roller 29, the exit roller 32, and the document ejection roller 37. The clutch 52 controls rotation of only the document feed roller 25 and the pickup roller 24. The conveyance drivers, such as the first conveyance roller 28, the second conveyance roller 29, the exit roller 32, and the document ejection roller 37, are constantly coupled to the output shaft of the document feed motor 51. Accordingly, the first conveyance roller 28, the second conveyance roller 29, the exit roller 32, and the document ejection roller 37 simultaneously are driven together.

The one-way clutch 53 is disposed on the drive transmission route from the document feed motor 51 to the cam shaft 42 of the cylindrical cam 41. When the document feed motor 51 rotates forward to convey the original document in the conveyance direction, the one-way clutch 53 shut off the driving force to the cylindrical cam 41, and when the document feed motor 51 rotates in reverse, the one-way clutch 53 couples and transmits the driving force of the document feed motor 51 to the cylindrical cam 41.

When picking up the original document upstream from conveyance device 27, the ADF 20 moves the pickup roller 24 downward to approach the document loading tray 21. Consequently, the pickup roller 24 abuts against the top of an uppermost original document placed on the bundle of original documents.

The pickup roller 24 performs a sheet pickup operation to rotate in the conveyance direction so as to draw the uppermost original document on the document loading tray 21, for example, in the conveyance direction. When an image reading operation of the original document is finished and the original document is ejected, the pickup roller 24 moves upwardly to separate from the document loading tray 21 and stops at a predetermined standby position. By so doing, the document loading tray 21 becomes ready to receive a subsequent bundle of original documents thereon.

The pickup roller 24 is rotatably supported by a pickup holder 26. The pickup holder 26 is swingably supported by the feed roller shaft 25a of the center of the document feed roller 25 via a known bi-directional torque limiter at left side end of the pickup holder 26 in FIG. 2.

Accordingly, the pickup holder 26 swings about the feed roller shaft 25a in the vertical direction in FIG. 2 so that the pickup holder 26 elevates or lowers the pickup roller 24 according to the rotation direction of the feed roller shaft 25a when the feed roller shaft 25a of the center of the document feed roller 25 rotates. The pickup roller 24 is coupled to the feed roller shaft 25a to rotate in conjunction with the feed roller shaft 25a via, for example, an endless belt and a pulley for drive transmission.

The feed roller shaft 25a of the center of the document feed roller 25 is driven to rotate by the document feed motor 51. The feed roller shaft 25a of the center of the document feed roller 25 rotates forward or in reverse according to the output rotation direction of the document feed motor 51.

When the output rotation direction of the document feed motor 51 is forward, a rotation force in the forward rotation direction is transmitted from the document feed motor 51 to the feed roller shaft 25a via a plurality of rotation transmitters, such as a plurality of gears. Thus, the feed roller shaft 25a is rotated in the forward rotation direction. At that time, feed roller shaft 25a rotates in the forward rotation direction to swing the pickup holder 26 downward to move the pickup roller 24 close to the document loading tray 21.

When the output rotation direction of the document feed motor 51 is in reverse, a rotation force in the reverse rotation direction is transmitted from the document feed motor 51 to the feed roller shaft 25a via the plurality of rotation transmitters, such as the plurality of gears. Thus, the feed roller shaft 25a is rotated in the reverse rotation direction. At that time, feed roller shaft 25a rotates in the reverse rotation direction to swing the pickup holder 26 upward to separate the pickup roller 24 from the document loading tray 21. By so doing, users can set a subsequent bundle of original documents on the document loading tray 21.

In the above described manner, the pickup roller 24 moves up and down between an upper position indicated by solid line in FIG. 2 and a lower position indicated by imaginary line in FIG. 2. The pickup roller 24 moves to the standby position from the time when the document feed motor 51 changes the output rotation direction into the reverse direction after the original document is ejected until a reverse angle of the feed roller shaft 25a reaches a set reverse angle corresponding to the lifting angle α illustrated in FIG. 2.

When the feed roller shaft 25a rotates in the reverse rotation direction, the pickup holder 26 swings upward and contacts the cover 38. At that time, excessive torque transmission and rotational force from the feed roller shaft 25a is cut off by the bi-directional torque limiter. Accordingly, the pickup holder 26 stops while touching the cover 38 during reverse rotation of the document feed motor 51.

When the feed roller shaft 25a rotates in the forward rotation direction, the pickup holder 26 swings downward and the pickup roller 24 contacts the original document. At that time, excessive torque transmission and rotational force from the feed roller shaft 25a to the pickup holder 26 is cut off by the bi-directional torque limiter. Accordingly, the pickup roller 24 contacts the original document at a proper contact pressure during forward rotation of the document feed motor 51.

An ascent and descent speed of the pickup holder 26 is set to slower than the speed during image reading, so as to reduce the sound generated when the pickup holder moves up and down and the roller trace on the original document.

Figure 5:
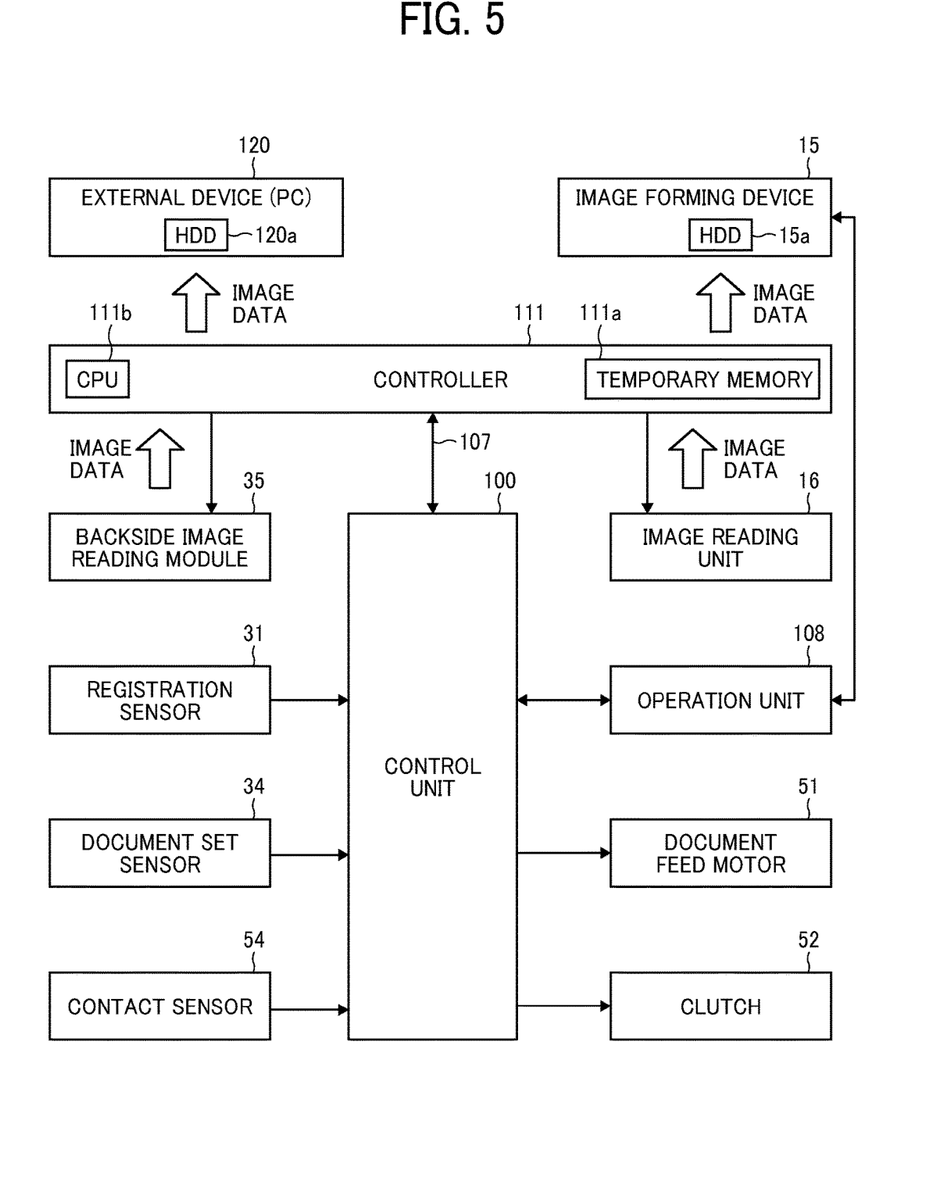
FIG. 5 is a block diagram illustrating a control system of the image reading device according to an embodiment of the present disclosure.

FIG. 5 is a block diagram illustrating a control system of the image reading device 5 according to the present embodiment.

The control device includes a control unit 100 and a controller 111. The control unit 100 of the image reading device 5 controls operations of the document feed motor 51; a various sensor such as the registration sensor 31, a document set sensor 34, a contact sensor 54, etc.; the clutch 52; and the like. The controller 111 controls operations of the image reading unit 16, the backside image reading module 35, and the like. The control unit 100 and the controller 111 are connected via an interface (I/F) circuit 107.

The document set sensor 34 detects a set feeler swingably attached to the document loading tray 21 to determine whether the original document is set on the document loading tray 21. Specifically, as the original document is set on the document loading tray 21, the set feeler contacts the original document and swings to change the posture thereof. The document set sensor 34 detects the set feeler, which changes the posture, to detect that the original document is set on the document loading tray 21.

The image data read by the image reading unit 16 and the backside image reading module 35 are transmitted to the controller 111 and stored in a temporary memory 111a of the controller 111. The image data stored in a temporary memory 111a may be transferred to a hard disk drive (HDD) 15a of the image forming device 15 or a HDD 120a of an external device 120 (e.g., personal computer).

In a case in which images of multiple original documents are successively read, a load of a central processing unit (CPU) 111b of the controller 111 may increase, a data transfer rate to the image forming device 15 or the external device 120 may slow down, or a write speed to write seek data in the HDD 15a of the image forming device 15 or the HDD 120a of the external device 120 may slow down. In the above case, an erase speed of the image data in the temporary memory 111a of the controller 111 is slower than image reading speed to store image data in the temporary memory 111a. Therefore, free space is insufficient to store the image data for subsequent original document in the temporary memory 111a. As a result, it is difficult to read the image data for subsequent original document correctly. Accordingly, the controller 111 transmits a ready signal of reading to the control unit 100 in a case in which the temporary memory 111a can store the image data. The control unit 100 controls conveyance of the original document based on the ready signal of reading.

Figure 6:
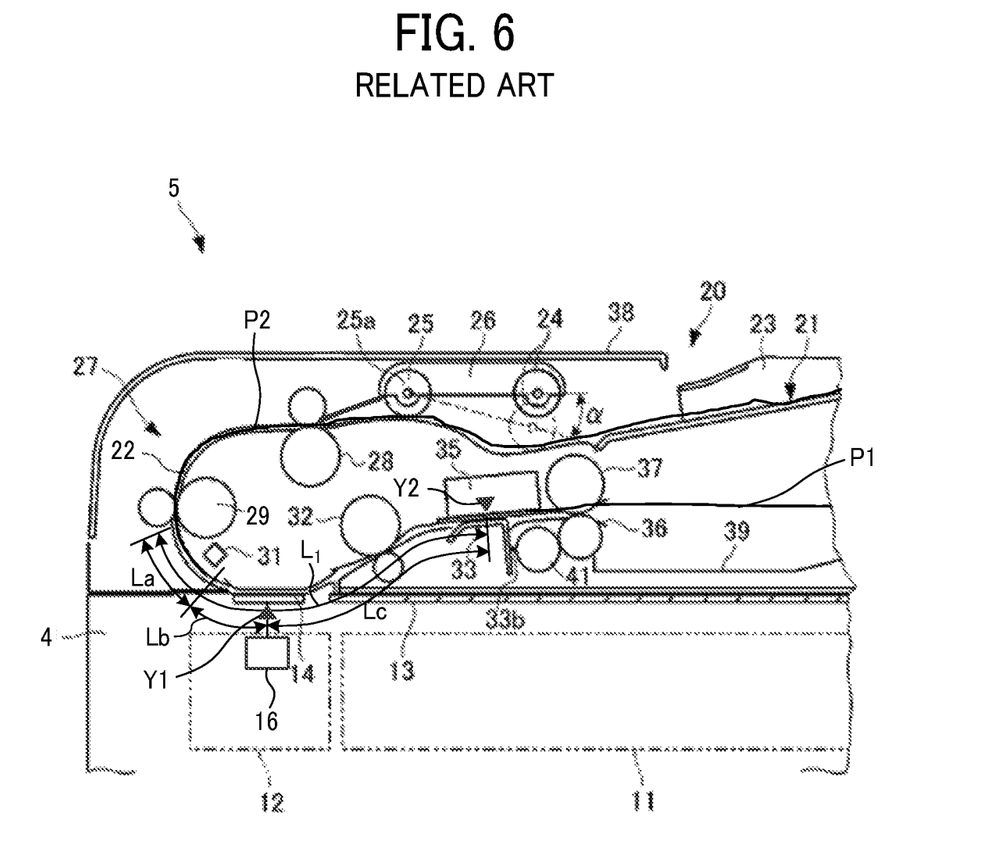
FIG. 6 is a schematic view illustrating a temporary stop of document conveyance according to a comparative image reading device.

FIG. 6 is schematic view illustrating a temporary stop of document conveyance according to a comparative image reading device 5.

According to the comparative image reading device 5 illustrated in FIG. 6, as the registration sensor 31 detects the leading end of the original document P2, the control unit 100 determines whether image reading has been ready. If the image reading has not been ready, the control unit 100 stops a next original document P2 before the next original document P2 reaches a reading position Y1 of the image reading unit 16. As described above, the first conveyance roller 28 and the second conveyance roller 29 are constantly coupled to the output shaft of the document feed motor 51. Accordingly, when the original document is stopped before the reading position Y1 of the image reading unit 16, the document feed motor 51 temporarily stops. As the document feed motor 51 stops, the exit roller 32 and the document ejection roller 37 stop.

However, if the exit roller 32 or the document ejection roller 37 stops during image reading of a previous original document P1, the image reading unit 16 and the backside image reading module 35 do not correctly read an image of the previous original document P1. Therefore, the document feed motor 51 desirably stops after the trailing end of the previous original document P1 has passed through the reading position. As a result, in a case in which both a front side image and a backside image of the original document are read, an interval of the original documents desirably exceeds at least a conveyance distance Lc of the original document from the reading position Y1 of the image reading unit 16 to the reading position Y2 of the backside image reading module 35.

Further, it takes a certain time for the conveyance speed of the original document to reach a prescribed speed from a start of driving the document feed motor 51. Therefore, the conveyance distance of the next original document P2 until the conveyance speed reaches the prescribed speed (a conveyance distance Lb during acceleration) is taken into account. As a result, the next original document P2 is stopped so that the leading end of the next original document P2 is separated by the conveyance distance Lb during acceleration upstream from the reading position Y1 of the image reading unit 16 or longer. Accordingly, the interval of the original documents is equal to or longer than a length Lb+Lc.

Further, the document feed motor 51 stops after deceleration from the prescribed speed. As a result, if the control unit 100 stops the document feed motor 51 after the trailing end of the previous original document P1 has passed through the reading position Y2 of the backside image reading module 35, the first conveyance roller 28 and the second conveyance roller 29 rotate and convey the next original document P2 by a certain distance during deceleration until the document feed motor 51 stops. Therefore, a conveyance distance of the next original document P2 after the document feed motor 51 stops is taken into account. Accordingly, the interval of the original documents is equal to or longer than a length Lb+Lc+La obtained by adding the length Lb+Lc to the conveyance distance La during deceleration of the first conveyance roller 28 and the second conveyance roller 19 until the conveyance roller stops after stop of the document feed motor 51.

According to the comparative image reading device 5, an interval L1 of the original documents is equal to or longer than a sum of the conveyance distance Lc of the original document from the reading position Y1 of the image reading unit 16 to the reading position Y2 of the backside image reading module 35, the conveyance distance La during deceleration of the first conveyance roller 28 and the second conveyance roller 29 until stopping from the stop of the document feed motor 51, and the conveyance distance during acceleration from the start of driving the document feed motor 51 until reaching the conveyance speed (i.e., L1≥La+Lb+Lc). As described above, productivity for reading images is poor because the interval of the original documents becomes long. In particular, as illustrated in FIG. 6, in the ADF 20 in which the conveyance roller, such as the exit roller 32, is disposed between the reading position Y1 of the image reading unit 16 and the reading position Y2 of the backside image reading module 35, the interval of the original documents becomes long because the conveyance distance Lc of the original document from the reading position Y1 of the image reading unit 16 to the reading position Y2 of the backside image reading module 35 is long.

Therefore, according to the present embodiment, the controller 111 predicts whether the capacity of the temporary memory 111a is insufficient. If the capacity of the temporary memory 111a is sufficient, the controller 111 transmits the ready signal of reading to the control unit 100. If the capacity of the temporary memory 111a is insufficient, the control unit 100 performs a stop control to stop the original document between a conveyance roller group for feeding sheet (i.e., a first conveyance roller group) and a conveyance roller group for conveying sheet (i.e., a second conveyance roller group). The first conveyance roller group includes the pickup roller 24 and the document feed roller 25 controlled by the clutch 52 on and off. The second conveyance roller group includes the first conveyance roller 28, the second conveyance roller 29, the exit roller 32, and the document ejection roller 37 controlled by the document feed motor 51 on and off without the clutch 52.

Figure 7:
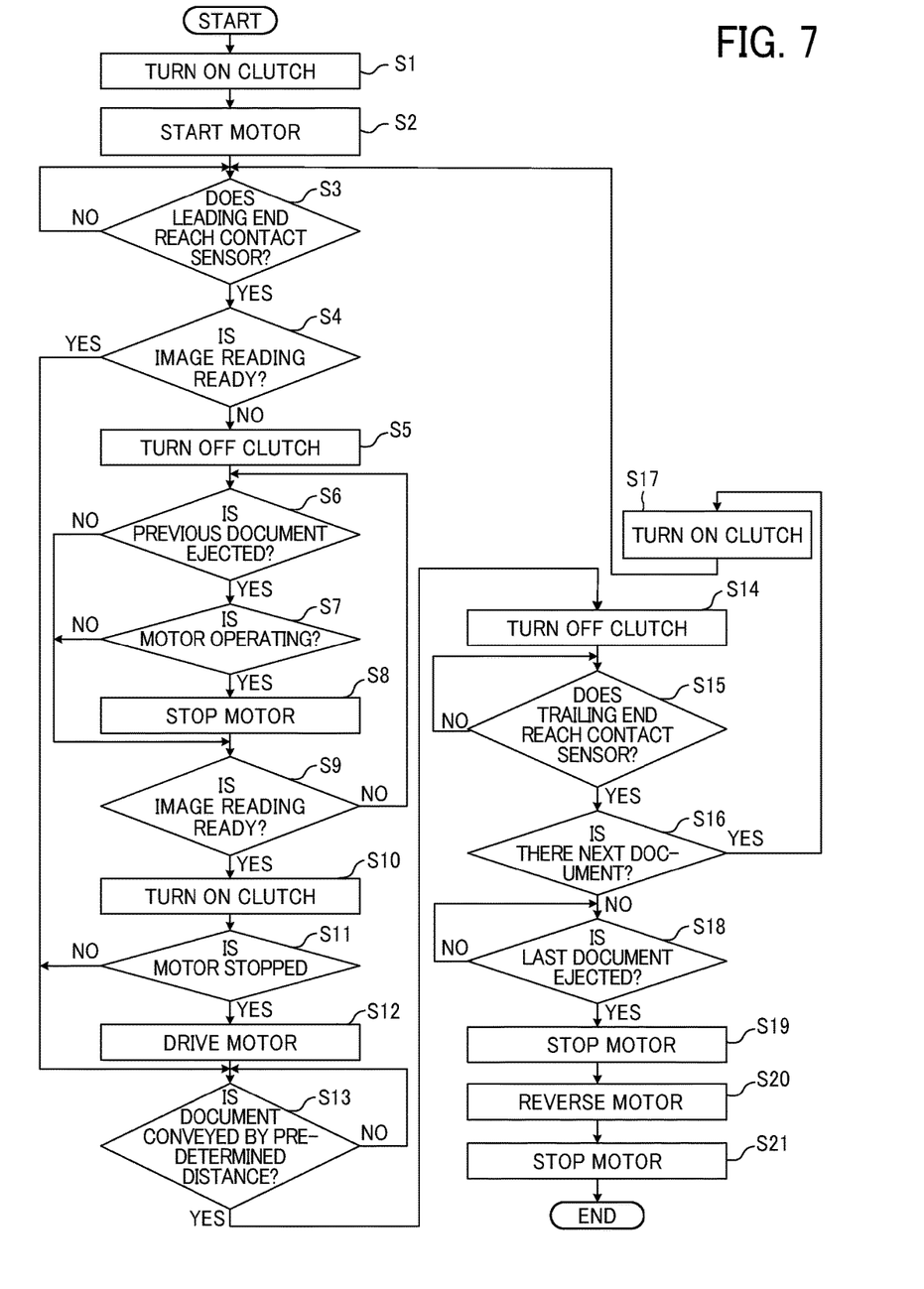
FIG. 7 is a flowchart of a control process of document conveyance according to an embodiment of the present disclosure.
Figure 8:
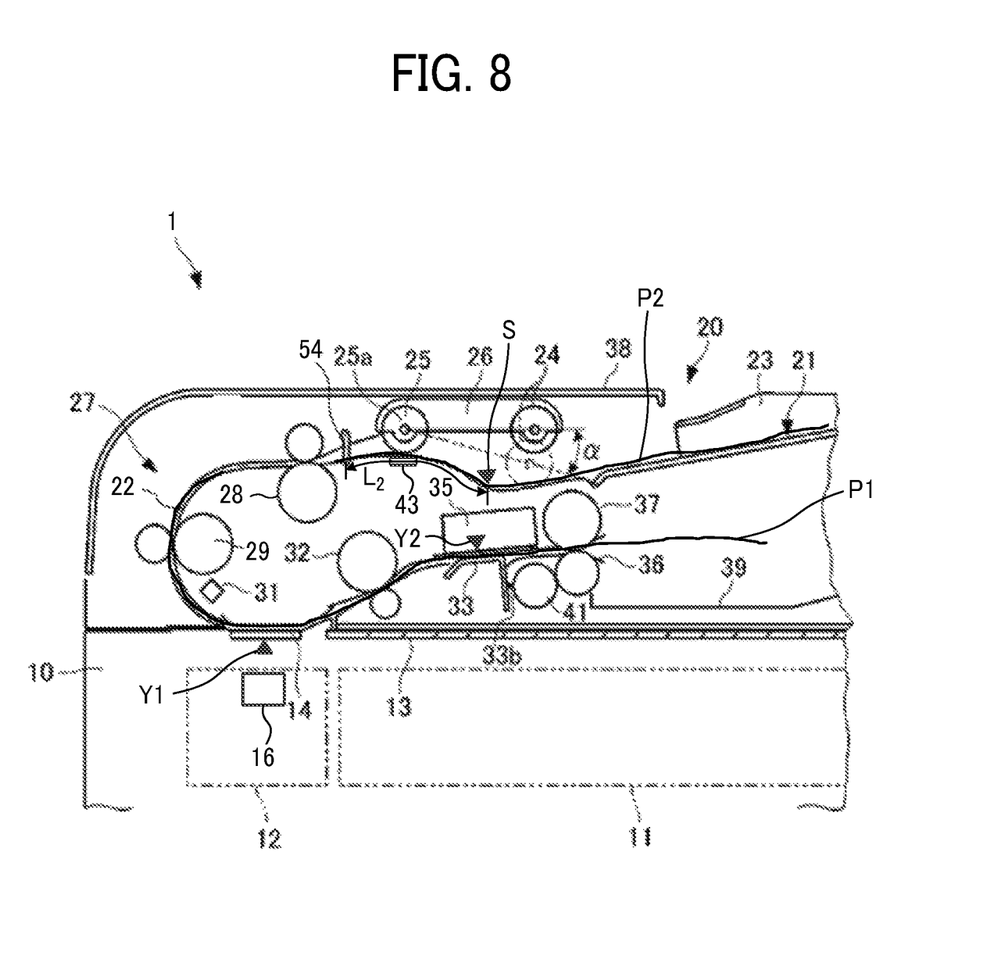
FIG. 8 is a schematic view illustrating a temporary stop of document conveyance according to an embodiment of the present disclosure.

FIG. 7 is a flowchart of a control process of the document conveyance according to the present embodiment. FIG. 8 is a schematic view illustrating a temporary stop of the document conveyance according to the present embodiment.

As the start of reading is required, for example, a copy start button of an operation unit 108 is pressed, the control unit 100 turns on the clutch 52 in step S1 and start driving the document feed motor 51 in step S2. Then, respective conveyance rollers: the pickup roller 24, the document feed roller 25, the first conveyance roller 28, the second conveyance roller 29, the exit roller 32, and document ejection roller 37, rotate, and the pickup roller 24 moves downward and contacts a topmost original document of the bundle of original documents on the document loading tray 21. Thus, the pickup roller 24 draws and conveys the topmost original document in the conveyance direction.

As the leading end of the original document passes through a separation nip formed between document feed roller 25 and the separation pad 43, and the contact sensor 54 as an end detector disposed between the document feed roller 25 and the first conveyance roller 28 detects the leading end of the original document ("Yes" in step S3), the control unit 100 checks whether the control unit 100 has accepted the ready signal of reading from the controller 111. As the contact sensor 54 detects the trailing end of the original document, the control unit 100 checks whether a next original document exists based on the result detected by the document set sensor 34. If the next original document exists, the control unit 100 informs the controller 111 of the existence of the original document. Accepting the information, the controller 111 transmits the ready signal of reading to the control unit 100 when the controller 111 predicts that the capacity of the temporary memory 111a is sufficient to temporarily store the image data of the next original document to be conveyed to the reading position (that is, image reading is ready) based on the transfer rate of the image data to the image forming device 15 or the external device 120, the amount of image data of the previous original document, and the interval of the original documents, which is a time to delete image data without data input. When the contact sensor 54 detects the leading end of the original document, if the control unit 100 has accepted the ready signal of reading from the controller 111 ("Yes" in step S4), the control unit 100 performs a non-stop control to continue conveying the original document.

On the other hand, when the contact sensor 54 detects the leading end of the original document, if the control unit 100 has not accepted the ready signal of reading from the controller 111 ("No" in step S4), the control unit 100 turns off the clutch 52, stops rotating the pickup roller 24 and the document feed roller 25, and performs the stop control to temporarily stop conveying the original document.

In the first original document, the image data is not stored in the temporary memory 111a, and there is sufficient free space in the temporary memory 111a. Therefore, the controller 111 transmits the ready signal of reading to the control unit 100 at the start of conveyance of the original document, and the control unit 100 performs the non-stop control.

When the control unit 100 accepts the ready signal of reading and the original document is conveyed by a predetermined conveyance distance (i.e., a distance from the detection position of the contact sensor 54 to the conveyance nip of the first conveyance roller 28 or longer) ("Yes" in step S13), the control unit 100 turns off the clutch 52 in step S14, and the document feed roller 25 and the pickup roller 24 stop rotating. When the contact sensor 54 detects the trailing end of the original document ("Yes" in step S15), and the next original document exists ("Yes" in step S16), the control unit 100 turns on the clutch 52 again in step S17 and start to feed the next original document.

Regarding the next original document, in the case of the non-stop control ("Yes" in step S4), as illustrated in FIG. 8, the interval of the next original document is a conveyance distance L2 from a contact position S of the leading end of the original document set on the document loading tray 21 to the detection position of the contact sensor 54.

On the other hand, when the contact sensor 54 detects the leading end of the original document, if the control unit 100 has not accepted the ready signal of reading ("No" in step S4), the control unit 100 performs the stop control and turns off the clutch 52, and the pickup roller 24 and the document feed roller 25 stop rotating. As a result, as illustrated in FIG. 8, the original document P2 stops with the leading end positioned between the document feed roller 25 and the first conveyance roller 28. In the present embodiment, the original document stops before the conveyance roller group for conveying, to which the driving force of the document feed motor 51 is transmitted without the clutch 52, such as the first conveyance roller 28, the second conveyance roller 29, the exit roller 32, and the document ejection roller 37. Therefore, the original document can temporarily stop without stopping the document feed motor 51. As a result, as illustrated in FIG. 8, the original document P2 can temporarily stop while the previous original document P1 passes through the reading position Y1 of the image reading unit 16 or the reading position Y2 of the backside image reading module 35. Thus, in a case in which both the front side image and the backside image of the original document are read, the interval of the original documents can be the conveyance distance L2 from the contact position S of the leading end of the original document set on the document loading tray 21 to the detection position of the contact sensor 54. Therefore, if the interval of the original documents becomes shorter than the comparative interval described above with reference to FIG. 6, the images on both sides of the original document can be read correctly. Therefore, the productivity of reading can further be improved than before.

As described in FIG. 7, if the control unit 100 accepts the ready signal of reading from the controller 111 ("Yes in step S9), the control unit 100 turns on the clutch 52 in step S10 and resumes conveying the original document.

Even if the previous original document P1 has been ejected onto the document ejection tray 39, when the control unit 100 does not accept the ready signal of reading from the controller 111 ("Yes" in steps S6 and S7), the document feed motor 51 stops. As a result, power consumption and noises can be minimized, as compared with the case in which the document feed motor 51 continues to drive even after the previous original document is ejected.

If an execution flag of shading correction is set when the contact sensor 54 detects the leading end of the original document, even if the control unit 100 accepts the ready signal of reading, the control unit 100 turns off the clutch 52 and performs the stop control to temporarily stop the document conveyance. After the previous original document is ejected to the document ejection tray 39, the control unit 100 stops the document feed motor 51 and rotates the document feed motor 51 in reverse, and the control device (i.e., the control unit 100 and the controller 111) performs shading correction while moving the white guide 33 in main-scanning direction. When the shading correction is completed, the control unit 100 stops the document feed motor 51 and turns on the clutch 52. After turning on the clutch 52, the control unit 100 drives the document feed motor 51 again and starts conveying the original document.

The conveyance control of the original document in steps S3 through S17 illustrated in FIG. 7 is repeated until the next original document disappears. As the last original document is ejected to the document ejection tray 39 ("Yes" in steps S16 and S18), the control unit 100 stops the document feed motor 51 in step S19, rotates the document feed motor 51 in reverse in step S20, and moves the pickup roller 24 upward. Then, the control unit 100 turns off the clutch 52 and stops the document feed motor 51 in step S21.

According to the present embodiment, the original document stops with the leading end positioned between the document feed roller 25 and the first conveyance roller 28 in the stop control. The above described configuration according to the present embodiment has the following advantage as compared with a comparative configuration in which the driving force of the document feed motor 51 is transmitted to the first conveyance roller 28 and the second conveyance roller 29 via a clutch, and the original document stops with the leading end positioned between the registration sensor 31 and the reading position Y1 of the image reading unit 16. That is, in a case in which one motor drives all the conveyance rollers of the ADF 20, the driving force of the document feed motor 51 is transmitted to the conveyance roller group for feeding the original document set on the document loading tray 21, such as the pickup roller 24 and the document feed roller 25, via the clutch 52 in order to prevent double feeding. Therefore, since the original document stops between the document feed roller 25 and the first conveyance roller 28 without adding a new clutch, as compared with a comparative configuration in which the original document stops with the leading end positioned between the registration sensor 31 and the reading position Y1 of the image reading unit 16, the number of components can be reduced and the cost of the device can be reduced.

The structures described above are just examples, and various aspects of the present disclosure can attain, for example, the following effects, respectively.

Aspect 1

An image reading device includes a plurality of conveyance rollers, such as the pickup roller 24, the document feed roller 25, the first conveyance roller 28, the second conveyance roller 29, the exit roller 32, and the document ejection roller 37 in the above-described embodiment, to convey a sheet such as an original document; a motor, such as the document feed motor 51, to drive the plurality of conveyance rollers; an image reading unit, such as the image reading unit 16 and the backside image reading module 35 in the above-described embodiment, to read an image of the sheet conveyed by the plurality of conveyance rollers; a control device, such as the control unit 100 and the controller 111 in the above-described embodiment, to perform a stop control that stops the sheet in a course of a conveyance path (e.g., a document conveyance path 22); and a clutch, such as the clutch 52, to transmit a driving force of the motor. A first conveyance roller group includes at least one of the plurality of conveyance rollers upstream from a leading end of the sheet stopped by the stop control in a conveyance direction. The driving force is transmitted to the first conveyance roller group (e.g., the pickup roller 24 and the document feed roller 25 in the above-described embodiment) via the clutch, such as the clutch 52. A second conveyance roller group includes at least one of the plurality of conveyance rollers downstream from the leading end of the sheet stopped by the stop control in the conveyance direction. The driving force is transmitted to the second conveyance roller group (e.g., the first conveyance roller 28, the second conveyance roller 29, the exit roller 32, and the document ejection roller 37 in the above-described embodiment) without the clutch.

According to the Aspect 1, when the leading end of the sheet conveyed by the conveyance roller of the first conveyance roller group in the conveyance direction reaches a position at which the leading end of the sheet is stopped by the stop control in the conveyance direction, the control device turns off the clutch and stops rotation of the first conveyance roller group. Therefore, the sheet can be stopped in the course of the conveyance path without stopping the motor.

Further, a driving force of the motor is transmitted to the conveyance roller of the second conveyance roller group without the clutch. As a result, the number of clutches can be reduced, and the cost of the device can be reduced as compared with a comparative image reading device provided with clutch corresponding to each conveyance roller.

Aspect 2

In Aspect 1, the at least one of the plurality of conveyance rollers included in the first conveyance roller group is a conveyance roller for separating the sheet from the plurality of sheets loaded on a sheet loading tray, such as the document loading tray 21, one by one and feeding the sheet in the conveyance path (e.g., the pickup roller 24 and the document feed roller 25 in the above-described embodiment).

As described in the above embodiments, the clutch provided for preventing double feeding can be used for the stop control. Therefore, the increase of the cost of the device can be minimized because an additional clutch is not needed.

Aspect 3

In Aspect 1, the control device such as the control unit 100 and the controller 111 determines whether to perform the stop control or a non-stop control that conveys the sheet without stopping.

According to the above configuration, when it is unnecessary to stop conveying the sheet in the course of conveyance path, the control device can perform the non-stop control that conveys the sheet in non-stop manner. Therefore, the decrease of productivity for conveying the sheet can be minimized as compared with a case in which the stop control is constantly performed.

Aspect 4

In Aspect 3, an end detector, such as the contact sensor 54, is disposed between the first conveyance roller group (e.g., the pickup roller 24 and the document feed roller 25) and the second conveyance roller group (e.g., the first conveyance roller 28, the second conveyance roller 29, the exit roller 32, and the document ejection roller 37). The end detector detects the end of the sheet in the conveyance direction. The control device such as the control unit 100 and the controller 111 determines whether to perform the stop control or the non-stop control when the end detector detects the leading end of the sheet in the conveyance direction.

According to the above configuration, when performing the stop control, the control device can stop the lading end of the sheet between the first conveyance roller group and the second conveyance group (i.e., between the document feed roller 25 and the first conveyance roller 28 in the above-described embodiment).

Aspect 5.

In Aspect 3, when the leading end of the sheet in the conveyance direction reaches a position between the first conveyance roller group and the second conveyance roller group, the control device, such as the control unit 100 and the controller 111, predicts whether image reading is ready by the time the sheet reaches a reading position of the image reading unit without stopping. The control device performs the non-stop control when predicting that the image reading is ready. On the other hand, the control device performs the stop control when predicting that the image reading is not ready.

According to the above configuration, as described in the above embodiments, the image reading device can read the image properly.

Aspect 6.

In Aspect 5, if the stop control continues even after a previous sheet conveyed prior to the sheet being stopped by the stop control is ejected, the control device, such as the control unit 100 and the controller 111, stops driving the motor.

According to the above configuration, as described in the above embodiments, an electric power consumption and a noise can be minimized as compared with a case in which the motor, such as the document feed motor 51, continues driving after the previous original document is ejected.

Aspect 7.

In Aspect 1, the image reading device further comprising a correction reference, such as the white reference 33*a*, of an image read by the image reading device. The control device, such as the control unit 100 and the controller 111, causes the image reading unit to read the correction reference, such as the white reference 33*a*, at a predetermined timing, obtains shading data for correcting the image read by the image reading device, and performs shading correction by use of the shading data. At the predetermined timing for performing the shading correction, the control unit performs the stop control until the shading correction is completed. Users or service persons can arbitrarily set the predetermined timing.

According to the above configuration, the control device can stop the sheet in the course of conveyance path and performs the shading correction.

Aspect 8

In Aspect 1, the image reading device according to claim 1, the image reading unit includes a first image reading unit such as the image reading unit 16 to read an image of a first side of the sheet and a second image reading unit such as the backside image reading module 35 disposed downstream from the first image reading unit in the conveyance direction, to read an image of a second side of the sheet.

According to the above configuration, the image reading unit can read images on both sides of the sheet in one-pass conveyance. Further, in the both side image reading in the one-pass conveyance, in a case in which the control device performs the stop control that stops the motor, such as the document feed motor 51, to stop the sheet in the course of the conveyance path, the interval of the original documents generally become longer, but with the above configuration according to Aspect 1, the image reading unit can convey the sheets with short intervals, and the productivity for reading images on both sides of the sheet can be enhanced.

Aspect 9

In Aspect 8, the at least one of the plurality of conveyance rollers included in the second conveyance roller group (e.g., the exit roller 32) is disposed between the first image reading unit such as the image reading unit 16 and the second image reading unit such as the backside image reading module 35.

In the above configuration, Aspect 1 is adopted to effectively enhance the productivity for reading both sides image of the sheet.

Aspect 10

An image forming apparatus includes the image reading device, such as the image reading device 5, according to Aspect 1 and an image forming device, such as the image forming device 15, to form an image based on the image read by the image reading device.

According to the above configuration, the productivity for reading images can be enhanced, and the image forming apparatus can reliably copy the images.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image reading device comprising:
    a clutch configured to transmit a driving force of a motor;
    a plurality of conveyance rollers driven by the motor to convey a sheet along a conveyance path, the plurality of conveyance rollers including a first conveyance roller group and a second conveyance roller group, the first conveyance roller group including at least one of the plurality of conveyance rollers upstream from a leading end of the sheet stopped by a stop control in a conveyance direction, the driving force of the motor being transmitted to the first conveyance roller group via the clutch, and the second conveyance roller group including at least one of the plurality of conveyance rollers downstream from the leading end of the sheet stopped by the stop control in the conveyance direction, the driving force of the motor being transmitted to the second conveyance roller group without the clutch;
    an image reading unit to read an image of the sheet conveyed by the plurality of conveyance rollers;
    an end detector between the first conveyance roller group and the second conveyance roller group, the end detector configured to detect an end of the sheet in the conveyance direction; and
    a control device configured to,
        determine whether to perform the stop control that stops the sheet in a course of the conveyance path by, in response to the end detector detecting the end of the sheet, predicting whether image reading is ready by a time the sheet reaches a reading position of the image reading unit without stopping, and
        perform the stop control by turning off the clutch until the image reading is ready, when the control device predicts that the image reading is not ready.

2. The image reading device according to claim 1, further comprising:
    a sheet loading tray to load a plurality of sheets, wherein the at least one of the plurality of conveyance rollers included in the first conveyance roller group is a conveyance roller for separating the sheet from the plurality of sheets and feeding the sheet along the conveyance path.

3. The image reading device according to claim 1, wherein the control device is configured to determine whether to perform the stop control or a non-stop control that conveys the sheet without stopping.

4. The image reading device according to claim 3, wherein,
    wherein the control device is configured to perform the non-stop control when the control device predicts that the image reading is ready.

5. The image reading device according to claim 4, wherein, if the stop control continues even after a previous sheet conveyed prior to the sheet being stopped by the stop control is ejected, the control device is configured to stop driving the motor.

6. The image reading device according to claim 1, further comprising:
    a white reference as a correction reference of an image read by the image reading device, wherein
        the control device is configured to,
            cause the image reading unit to read the white reference at a set timing,
            obtain shading data for correcting the image read by the image reading device, and
            perform shading correction by use of the shading data, and
            perform the stop control at the set timing for performing the shading correction until the shading correction is completed.

7. The image reading device according to claim 1, wherein the image reading unit includes:
    a first image reading unit to read an image on a first side of the sheet; and
    a second image reading unit disposed downstream from the first image reading unit in the conveyance direction of the sheet, to read an image on a second side of the sheet.

8. The image reading device according to claim 7, wherein the at least one of the plurality of conveyance rollers included in the second conveyance roller group is between the first image reading unit and the second image reading unit.

9. An image forming apparatus comprising:
    the image reading device according to claim 1; and
    an image forming device to form an image based on image data read by the image reading device.

10. The image reading device of claim 1, wherein the control device is configured to determine whether to perform the stop control by predicting whether the image reading is ready by the time the sheet reaches a reading position of the image reading unit without stopping based on at least (i) a transfer rate of an image data to the image forming device, (ii) an amount of the image data of a previous sheet, and (iii) a time to delete the image data of the previous sheet.

11. A method of operating an image reading device, the image reading device including a clutch configured to transmit a driving force of a motor, a plurality of conveyance rollers driven by the motor to convey a sheet along a conveyance path, the plurality of conveyance rollers including a first conveyance roller group and a second conveyance roller group, the first conveyance roller group including at least one of the plurality of conveyance rollers upstream from a leading end of the sheet stopped by a stop control in a conveyance direction, the driving force of the motor being transmitted to the first conveyance roller group via the clutch, and the second conveyance roller group including at least one of the plurality of conveyance rollers downstream from the leading end of the sheet stopped by the stop control in the conveyance direction, the driving force of the motor being transmitted to the second conveyance roller group without the clutch, an image reading unit to read an image of the sheet conveyed by the plurality of conveyance rollers; and an end detector between the first conveyance roller group and the second conveyance roller group, the end detector configured to detect an end of the sheet in the conveyance direction, the method comprising:

determining whether to perform the stop control that stops the sheet in a course of the conveyance path by, in response to the end detector detecting the end of the sheet, predicting whether image reading is ready by a time the sheet reaches a reading position of the image reading unit without stopping; and performing the stop control by turning off the clutch until the image reading is ready, when the determining predicts that the image reading is not ready.

12. The method of claim 11, wherein the determining further comprising:

determining whether to perform the stop control or a non-stop control that conveys the sheet without stopping.

13. The method of claim 12, further comprising:

performing the non-stop control when the determining predicts that the image reading is ready.

14. The method of claim 11, wherein the determining determines whether to perform the stop control by predicting whether the image reading is ready by the time the sheet reaches a reading position of the image reading unit without stopping based on at least (i) a transfer rate of an image data to the image forming device, (ii) an amount of the image data of a previous sheet, and (iii) a time to delete the image data of the previous sheet.

* * * * *